United States Patent [19]
Fulop et al.

[11] Patent Number: 5,712,526
[45] Date of Patent: Jan. 27, 1998

[54] BALLAST CIRCUIT BOARD MOUNTING ARRANGEMENT FOR AN INTEGRAL COMPACT FLUORESCENT LAMP

[75] Inventors: Jozsef Fulop; Istvan Wursching, both of Budapest, Hungary

[73] Assignee: General Electric Company, Schenectady, N.Y.

[21] Appl. No.: 504,980

[22] Filed: Jul. 20, 1995

[30] Foreign Application Priority Data

Jul. 20, 1994 [HU] Hungary ............... P 94 02141

[51] Int. Cl.⁶ ................................................ H01J 1/62
[52] U.S. Cl. ........................... 313/493; 315/58; 315/71
[58] Field of Search .................. 313/318.01, 318.02, 313/318.04, 493, 318.12; 315/57, 58, 56, 70, 71; 439/375, 376, 377; 461/748, 756

[56] References Cited

U.S. PATENT DOCUMENTS

| | | | |
|---|---|---|---|
| 4,302,794 | 11/1981 | Audesse et al. | 362/240 |
| 4,303,962 | 12/1981 | Wolber et al. | 362/23 |
| 4,695,767 | 9/1987 | Wittmann | 313/493 |
| 5,345,142 | 9/1994 | Chamberlain et al. | 313/318.04 |

Primary Examiner—Sandra L. O'Shea
Assistant Examiner—Jay M. Patidar
Attorney, Agent, or Firm—George E. Hawranko

[57] ABSTRACT

The invention relates to a single-ended discharge lamp with circuitry in its housing base. The discharge lamp includes a discharge tube and a housing. The discharge tube is provided with electrodes containing a fill and sealed in a gas-tight manner. The housing base contains circuitry mounted on a circuit board and providing for the operation of the discharge tube. The housing base is built from two parts, a base and a cap, fixed to each other. The housing base is formed in a way suitable for mechanical and electrical connection to a lamp socket on one part, and for mechanically fixing the discharge tube and connecting the output terminals of the circuitry to the electrode inleads of the discharge tube on the other part. The circuit board is inserted between supports formed in the inside of and protruding from one part of the housing base. One feature of the invention is that longitudinal ribs are formed on the support and protrude from the support. The ribs are so dimensioned that in the direction of insertion of the circuit board, the space available for the circuit board progressively decreases, which results in the circuit board moving up to a stop on the ribs over at least a part of the length thereof.

17 Claims, 8 Drawing Sheets

SECTION D-D

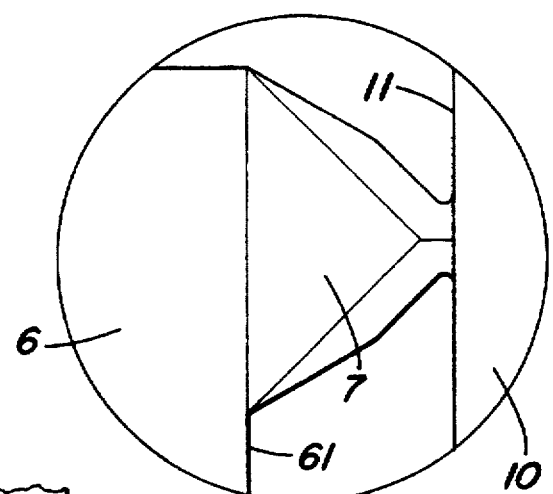
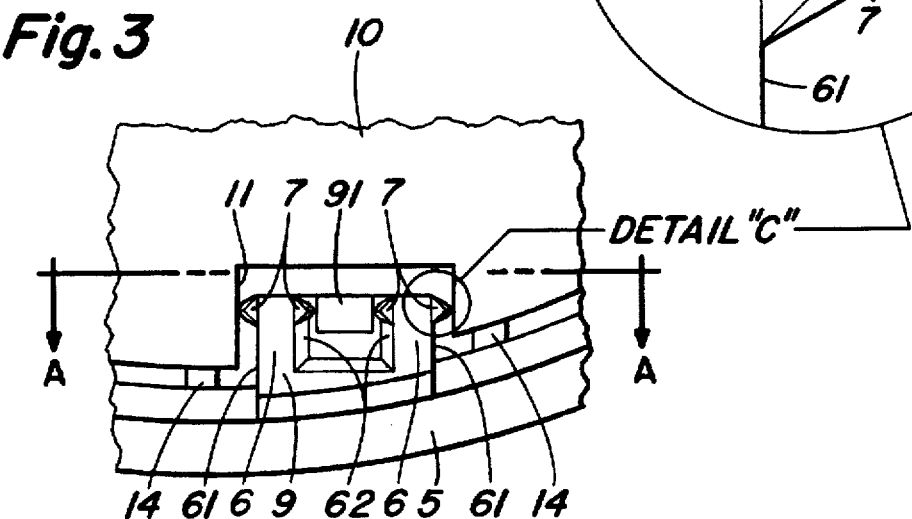
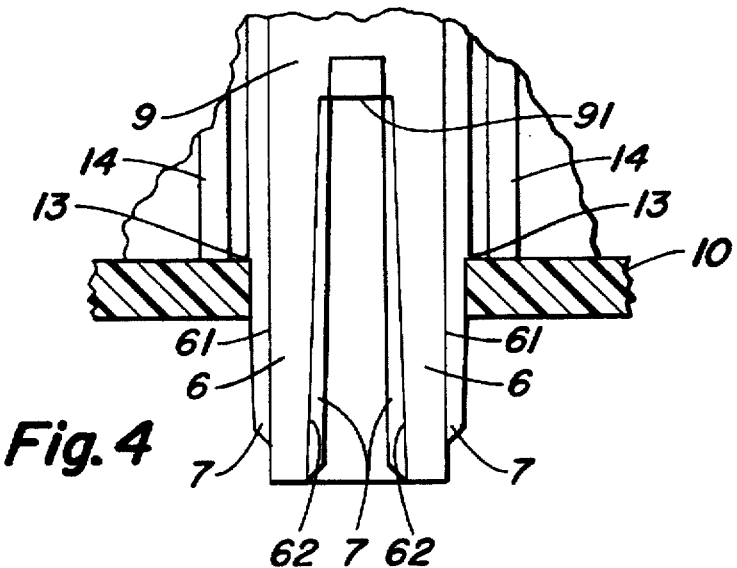
SECTION A-A

SECTION B-B

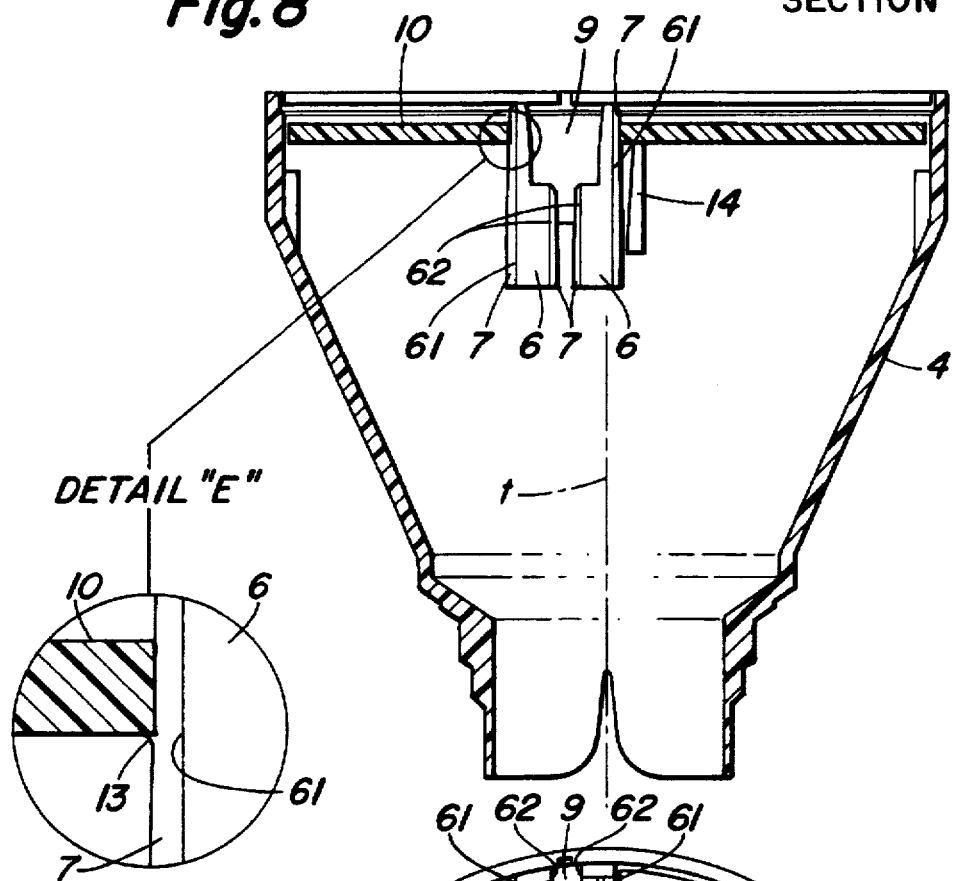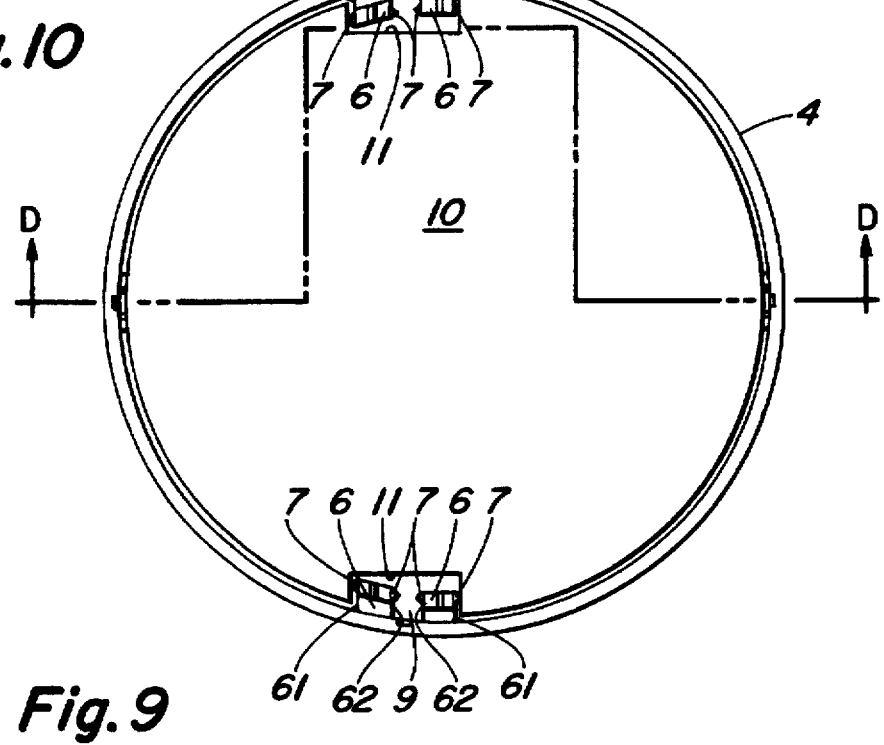

5,712,526

BALLAST CIRCUIT BOARD MOUNTING ARRANGEMENT FOR AN INTEGRAL COMPACT FLUORESCENT LAMP

FIELD OF THE INVENTION

This invention relates to a ballast circuit board mounting arrangement for an integral compact fluorescent lamp. More particularly, this invention relates to such a circuit board mounting arrangement, wherein even given variations in thickness of the circuit board, a positive mechanical connection between the ballast housing and the circuit board is achieved.

BACKGROUND OF THE INVENTION

Compact fluorescent lamps have found widespread acceptance in both residential and commercial settings because of their energy efficiency and long life characteristics. One common compact fluorescent lamp includes the ballast circuit integrally disposed within a base housing portion of the lamp. It has been found that in the manufacture of such lamps, particularly those where the ballast circuit is mounted on a printed circuit board, that variations in the thickness of such circuit boards have caused problems for the lighting manufacturers in adapting the manufacture of such lamps to high speed manufacturing operations.

In case of commercially available compact fluorescent lamps, a solution is seen in which the circuit board carrying the electronic circuitry with its plane parallel to the discharge lamp axis is fixed in a slot between supports formed in the housing shell where the width of the slot is to be chosen according to the thickness of the circuit board. Due to the variations in dimensions, this method of securing the circuit board can cause problems. Since the slot between the support does not follow the variation in circuit board dimensions, it may happen that the surfaces of the supports will not secure the circuit board if it is too thin and it can leave the slot during assembling. Also, if the circuit board is too thick, it cannot be moved into the stop position at the lower end of the slot, thereby causing a situation where the housing and the housing cap cannot be connected to each other.

SUMMARY OF THE INVENTION

The problem described is solved by forming longitudinal ribs on the support, by means of which slots tightening in the direction of circuit board insertion are produced and by which ribs the circuit board gets stuck.

According to this, our invention is a single-ended discharge lamp with a circuitry in its base housing, which discharge lamp comprises a discharge tube provided with electrodes, containing a fill and sealed in a gas-tight manner and also comprises a base housing which contains circuitry mounted on a circuit board thus providing for the operation of the discharge tube. The base housing is formed in a way suitable for mechanical and electrical connection to a lamp socket on one part, and for mechanically fixing the discharge tube and connecting the output terminals of the circuitry to the electrode inleads of the discharge tube on the other part, and the base housing is built from two parts: a base and a cap member fixed to each other. The circuit board inserted between plane surface supports formed in the inside of and protruding from one part of the base housing, and on the support(s), longitudinal rib(s) protruding from the surface thereof is (are) formed, which supports and ribs are dimensioned so that in the direction of circuit board insertions, the space available for the circuit board decreases more and more, and due to this the circuit board becomes fixed by the rib over at least a part of its length.

The decreasing space can be produced by gradually increasing, in the direction of insertion, the extent to which the rib protrudes from the support, or by means of the angle of inclination the plane surface carrying the rib makes with the plane of the circuit board. The supports together with the ribs protruding from their surface are preferably so dimensioned to fit to the tolerance range of the circuit board, i.e., circuit boards with dimensions at the lower side of the tolerance range can get stuck by the ribs at their ends which circuit boards with dimensions at the upper side of the tolerance range can still be inserted between the ribs.

The rib or ribs, in order to achieve fixing of the circuit board, preferably have a wedge-shaped profile.

The circuit board of the discharge lamp according to the invention can be placed in the base housing in perpendicular or parallel direction to the axis of the discharge lamp and the supports are oriented accordingly. In case when the circuit board is placed in the base housing in perpendicular direction to the axis of the discharge lamp, it is preferable to make a notch in the circuit board and the edges of the notch will become fixed by the ribs. In case when the circuit board is placed in the base housing in parallel direction to the axis of the discharge lamp, it is preferable if the circuit board becomes fixed by the rib along the plane side of the circuit board.

According to the invention it would be sufficient to form the rib only on one of the supports into which the circuit board is inserted but it is more preferable to have a rib on both supports. On each opposite side of the base housing, two supports are preferably placed, on each of which one rib is preferably formed.

BRIEF DESCRIPTION OF THE DRAWING

Our invention will be shown in more detail by means of examples illustrated by drawings in which:

FIG. 3 is an elevational view in section of the arrangement used for supporting the circuit board in the discharge lamp according to FIG. 1, shown in enlargement.

FIG. 4 is an elevational view in section of the arrangement FIG. 3 taken along Section A—A of FIG. 3.

FIG. 5 is an elevational view in section of Detail C of FIG. 3 in further enlargement.

FIG. 8 is an elevational view in section of a further embodiment of the discharge lamp according to the invention wherein the arrangement for supporting the circuit board is perpendicular to the axis of the discharge lamp.

FIG. 9 is top view of the embodiment according to FIG. 8.

FIG. 10 is an elevational view in section of the enlarged detail E of FIG. 8.

DETAILED DESCRIPTION OF THE INVENTION

Figure 1:
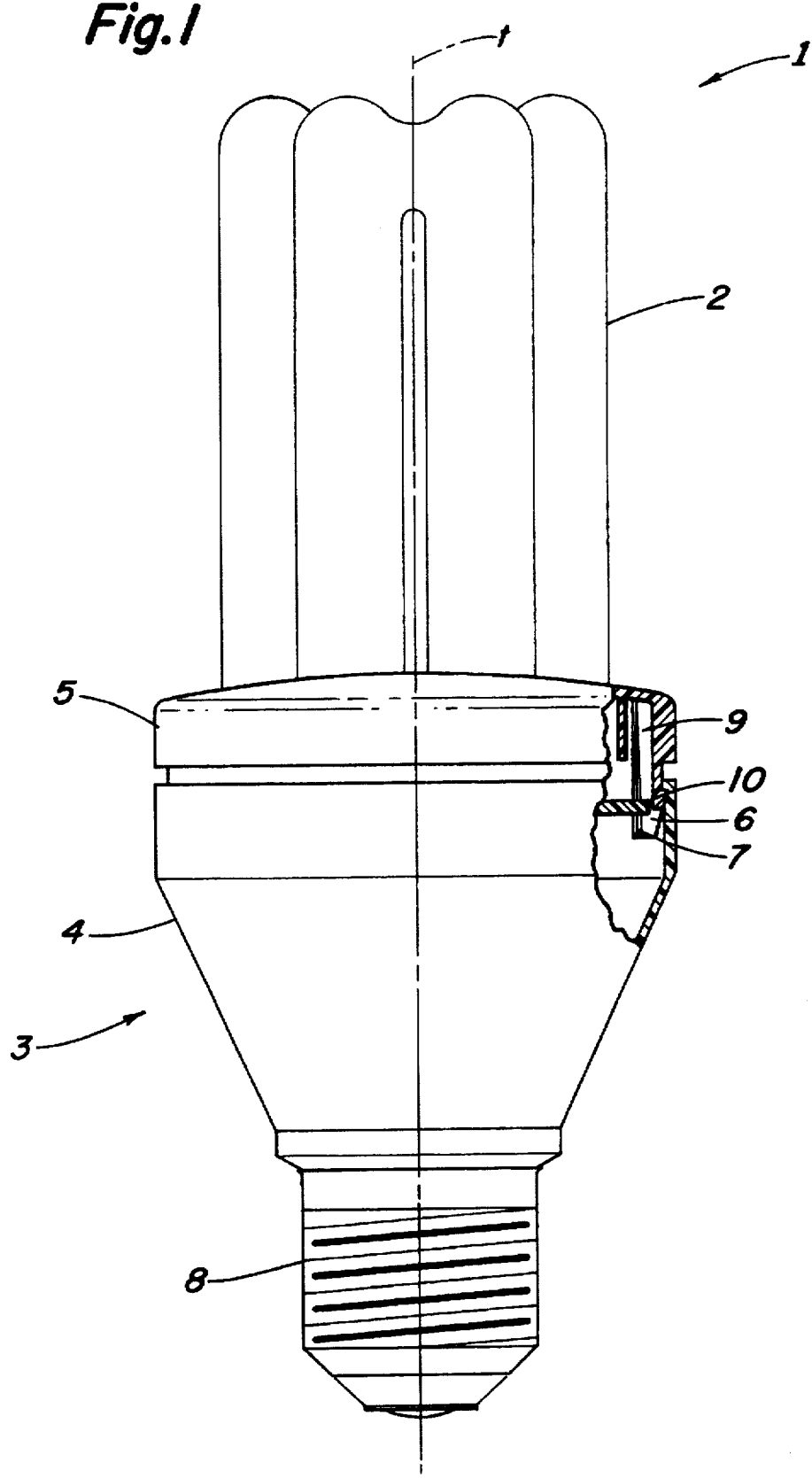
FIG. 1 is an elevational view in section of the discharge lamp according to the invention where the circuit board is perpendicular to the axis of the discharge lamp.
Figure 2:
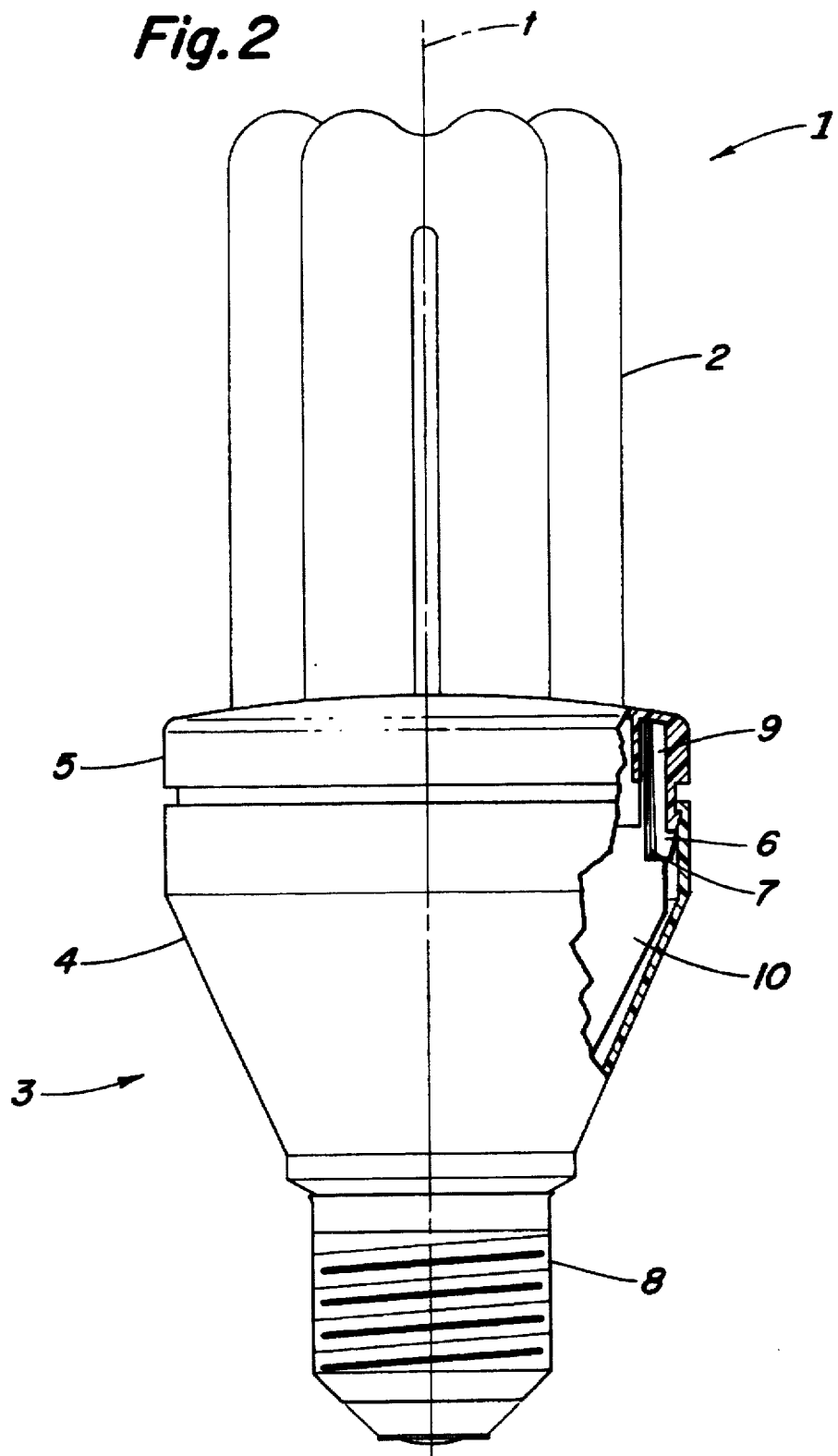
FIG. 2 is an elevational view in section of a further embodiment of the discharge lamp according to the invention where the circuit board is parallel to the axis of the discharge lamp.

FIGS. 1 and 2 show the fully assembled discharge lamp 1 according to the invention, which discharge lamp 1 is a compact fluorescent lamp, the discharge tube 2 of which is fixed in the cap member of the housing base 3. The housing base 3 consists of two plastic (e.g., Valox) parts fixed to each other, a base member 4 and the cap member 5, and a metallic screw 8 fixed to the base 4 in a conventional manner. The electronic circuitry operating the discharge tube 2 is placed in the housing base 3, the components of which or a part of which components are fixed on a printed circuit board 10. In FIG. 1 an arrangement is shown in which the circuit board 10 is perpendicular to the axis t of the discharge lamp 1 while in FIG. 2 and arrangement is shown in which the circuit board 10 is parallel to the axis t of the discharge lamp 1. Holders 9 that hold the circuit board 10 and comprise supports 6 and carrying ribs 7 are shown in both FIGS. 1 and 2 and are formed in the cap member 5. In FIGS. 3, 4 and 5, the way is shown in which the circuit board 10 in the discharge lamp 1 according to FIG. 1 is clamped. FIG. 3 shows how the circuit board 10 is clamped, perpendicularly to the view of FIG. 1 as viewed from the projection plane below the plane of circuit board 10. In this case the holder 9 comprising the two supports 6 has been formed in the cap member 5 from plastic, during injection molding of the cap member 5. Ribs 7 are formed on each side of the supports 6, one on outer surface 61 and one on inner surface 62. Circuit board 10 has a notch 11, each edge of which becomes fixed by rib 7. In FIG. 4, the Section A–A of the arrangement according to FIG. 3 is shown. It is seen in FIG. 3 that the ribs 7 are wedge-shaped and FIG. 4 shows that the ribs 7 are formed nearly over the entire length of supports 6. It is preferable to form the ribs 7 both on the outer 61 and on the inner surface 62 of supports 6 because this ensures that the construction can be used in case of circuit boards mounted in both orientations (both in perpendicular and in parallel direction to axis t of the discharge lamp 1), i.e., this makes the construction universal. In the manner shown in FIG. 4, supports 6 and ribs 7 placed on outer surfaces 61 should be formed so that in the direction of inserting the circuit board 10 (see the arrow) the distance between the edges of ribs 7 placed on outer surfaces 61 decreases and so the circuit board 10 becomes fixed by the ribs 7 along the edges of notch 11. During inserting the circuit board 10 in supports 6, the ribs 7 contacting the edges of notch 11 will become more and more deformed along their length, and the circuit board 10 will push before itself the material of the edge of rib 7 until becoming fixed. In FIG. 4 the material jam 13 produced by deformation is seen. The extent of insertion of the circuit board 10 in supports 6 is limited by stops 14 also being formed in the cap member 5. The ribs 7 on inner surfaces 62 and stop surface 91 have no role in this mounting orientation, only in the instance of being perpendicular to this.

In FIG. 5, Detail C around one of the ribs 7 shown in FIG. 3 is seen enlarged with the circuit board inserted.

In cap member 5, two holders 9 are preferably formed on the opposite sides of cap member 5, symmetrically to each other, of which only one is shown in the Figures.

Figure 6:
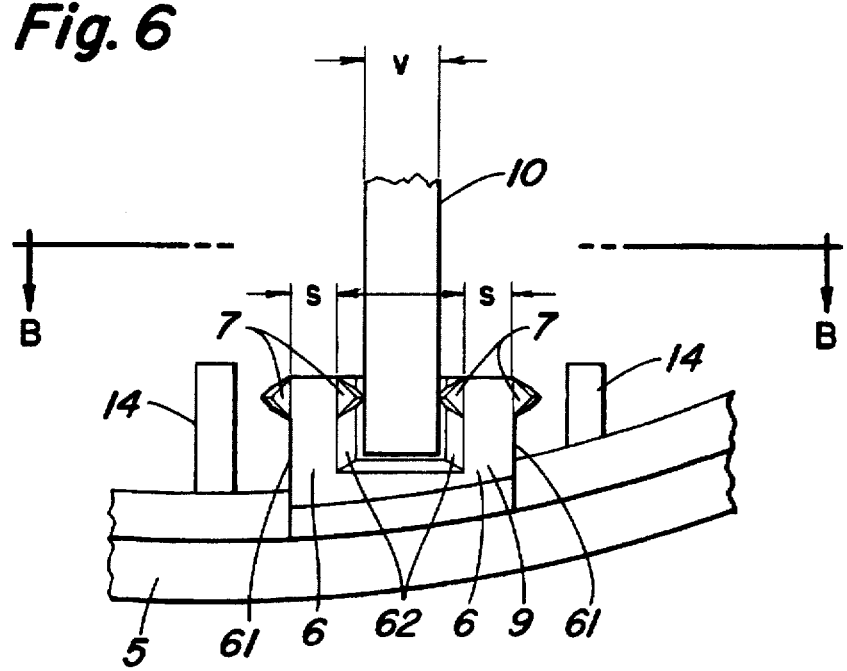
FIG. 6 is an elevational view in section of the arrangement used for supporting the circuit board in the discharge lamp according to FIG. 2, shown in enlargement.
Figure 7:
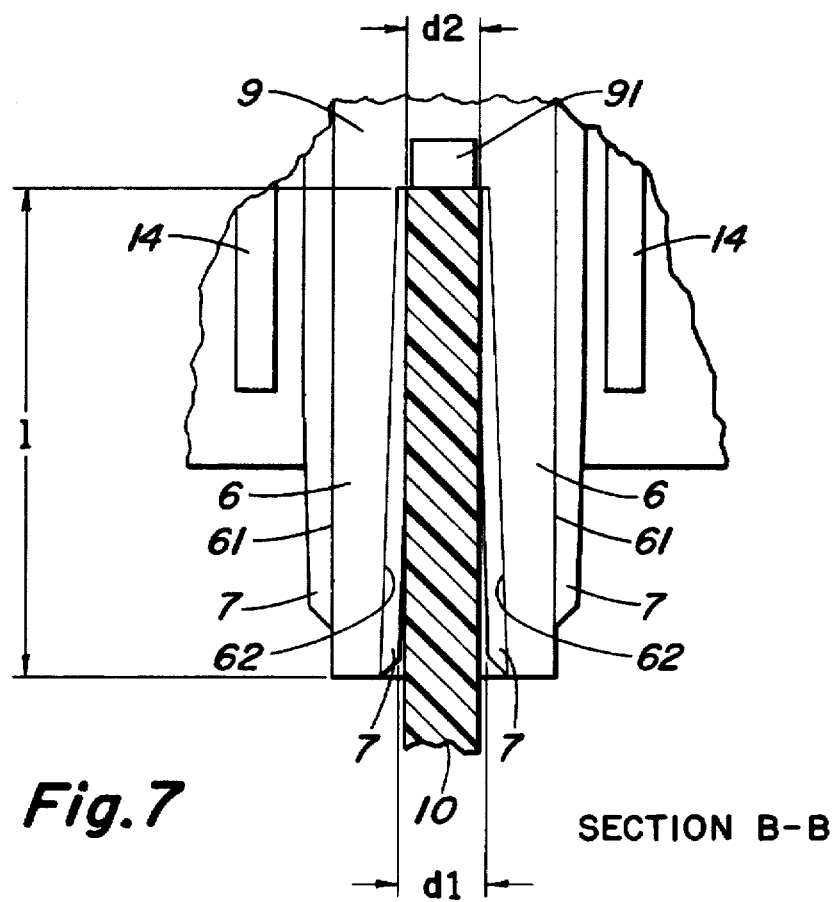
FIG. 7 is an elevational view of Section B—B of FIG. 6.

In FIGS. 6 and 7 it is seen how the circuit board 10 is fixed in the discharge lamp 1 according to FIG. 2. FIG. 6 shows a bottom view detail of that shown in the front view of FIG. 2, while FIG. 7, a detail of side view section of that shown in the front view of FIG. 2, i.e., the Section B—B of FIG. 6. Holder 9 comprising the supports 6 has been formed in cap member 5 from plastic, during the injection molding of cap member 5. On both sides of supports 6, one rib 7 is formed. The circuit board 10 is inserted between ribs 7 formed on the inner surfaces 62 of support 6 and is pushed in until reaching a stop surface 91. In dimensioning, the tolerance of the circuit board 10 should be accounted for to ensure that even the thinnest circuit board can become fixed and even the thickest circuit board can go in between the ribs. If the thickness v of the circuit board 10 is 1.6±0.2 mm then between the edges of ribs 7 which ribs are placed on inner surfaces 62 with 10 mm insertion length 1 and 2 mm width s, 1.8 mm distance d1 is preferably produced in the point of insertion and 1.4 mm distance d2 in the final position. Stops 14 and ribs 7 formed on the outer surfaces 61 of supports 6 have no role in case of circuit boards 10 with the orientation shown here. The play a role only in the case of circuit boards oriented perpendicularly to this. In this case also, two holders 9 are formed in the cap member 5 on the opposite sides of the cap 5, symmetrically to each other, of which holders 9 only one is shown in the Figures. The two holders 9 formed in base 4 and comprising supports 6 and ribs 7 produced on the outer 61 and inner surface 62 thereof are shown in front view (in Section D—D) in FIG. 8, and in top view in FIG. 9.

Circuit board 10 is perpendicular to the axis t and becomes fixed by ribs 7 formed on the outside surface 61 of supports 6, along the edges of notch 11 on circuit board 10. When inserting circuit board 10, a material jam 13 takes place as a result of deformation produced on rib 7 as seen in FIG. 10, enlarged Detail E.

Figure 11:
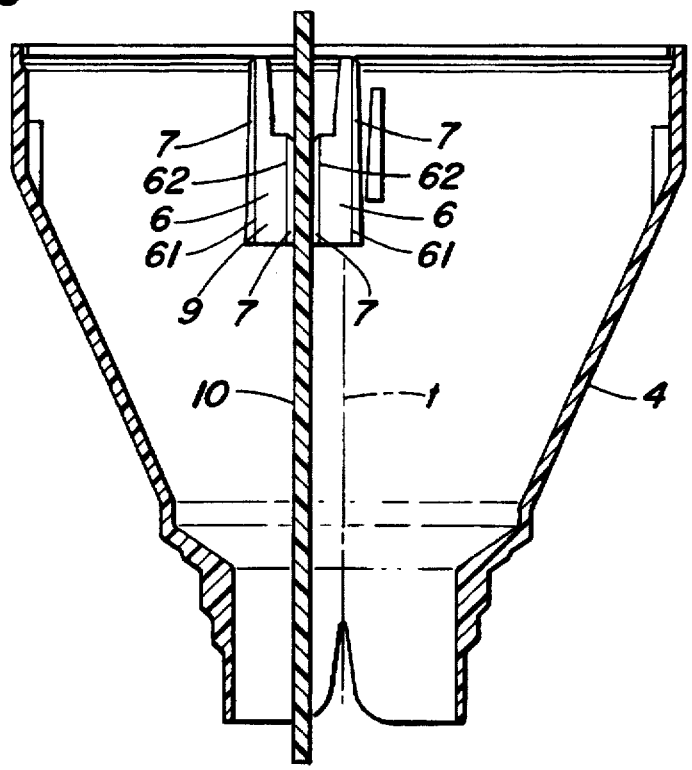
FIG. 11 is an elevational view in section of still another embodiment of the discharge lamp according to the invention wherein the arrangement for supporting the circuit board in front view section where the circuit board is parallel to the axis of the discharge lamp.
Figure 12:
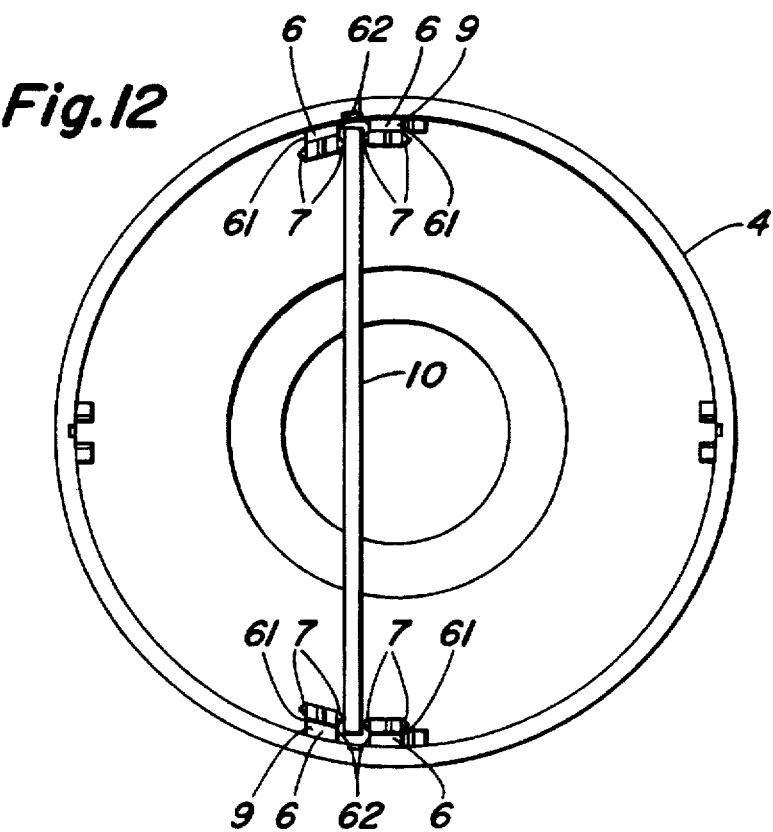
FIG. 12 is an elevational view in section of the embodiment according to FIG. 11.

The two holders 9 also formed in base 4 and comprising the supports 6 and ribs 7 formed on the outer surface 61 and inner surface 62 thereof, is seen in front view section in FIG. 11 and in top view in FIG. 12. The plane of circuit board 10 is parallel to the axis t and is clamped between the ribs 7 formed on the inner surfaces of supports 6. The ribs 7 formed on the outside surfaces 61 have no role in this case. The final mounting position of circuit board 10 is ensured by supporting on the conical part of base 4.

Figure 13:
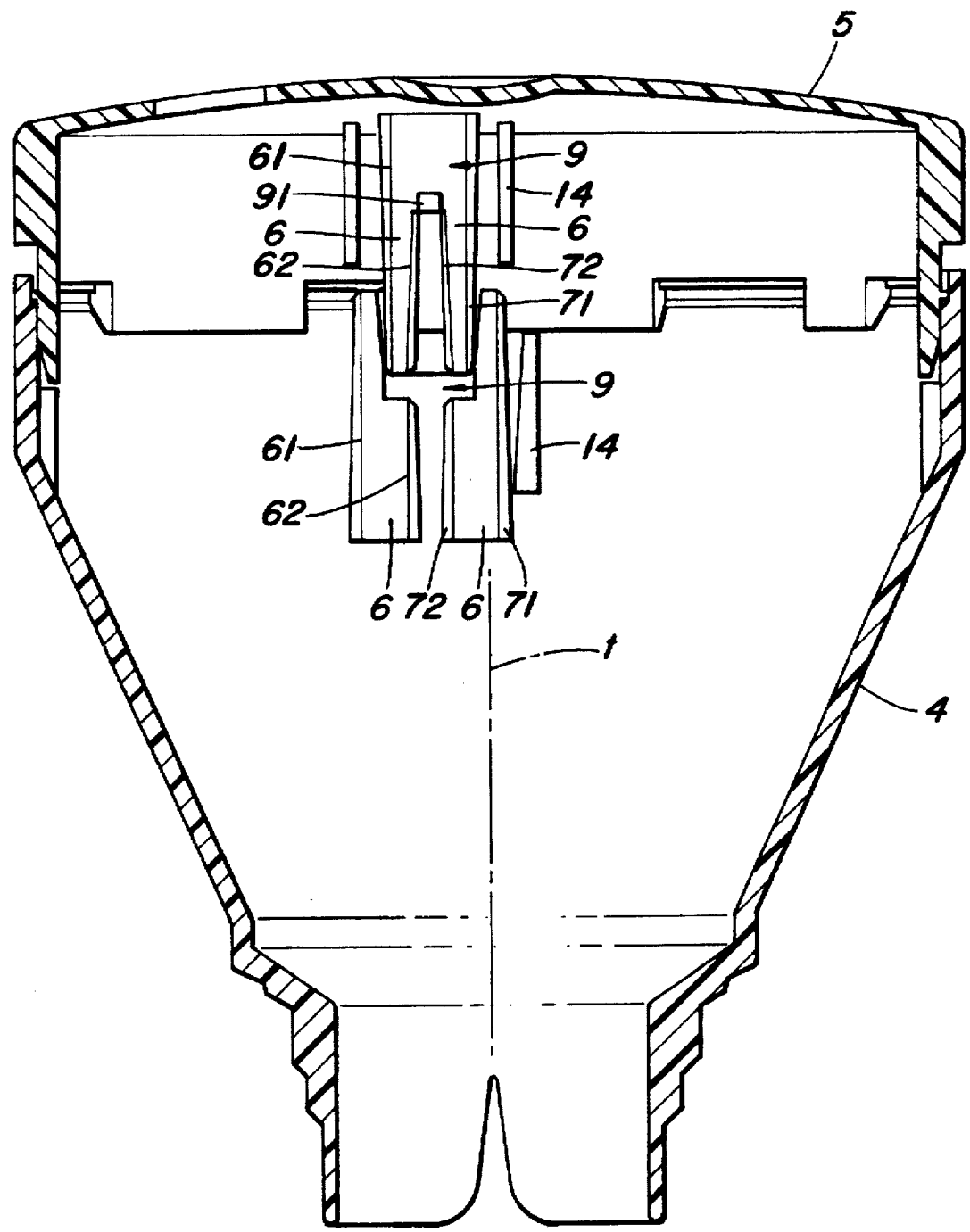
FIG. 13 is an elevational view in section of further embodiment of the discharge lamp according to the invention wherein a universal construction for the housing base is shown.

In FIG. 13 the cap 5 and base 4 of the discharge lamp according to the invention is shown in the condition snapped into each other, without circuit board, i.e., unmounted. In the solution according to the present examples, holders 9 are formed both in the cap 5 and in the base 4, preferably two of them in the base 4 and two in the cap 5. Each of the holders 9 comprises two supports 6, both on the outer 61 and on the inner 62 surface of which ribs 71 and 72 are formed. The solution according to the Figure is universal so far as the circuit board can be placed both in the base 4 and the cap 5, wherein in parallel or in perpendicular direction to the axis t. Stops 14 limit the final mounting position of circuit board 10 oriented perpendicularly to axis t, and stop surface 91 limits the final mounting position of circuit board 10 oriented in parallel direction to axis t.

Of course, cap 5 and base 4 do not need to be formed to have such a universal feature. This is necessary only when changes to the mounting process are intended to be done in a simple way without the need for changes to the existing housing or shell construction.

Figure 14A:
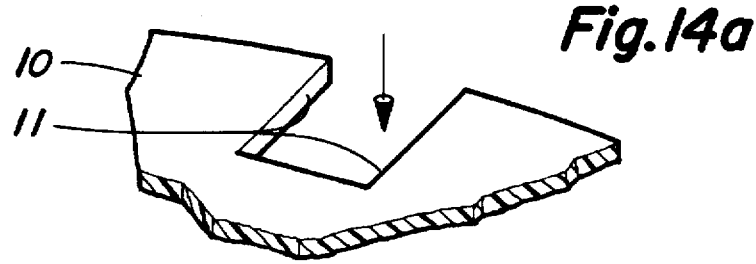
FIGS. 14a–14c are axonometric drawing for fitting the circuit board, and adapter and the housing to each other in a further embodiment of the discharge lamp according to the invention.
Figure 14B:
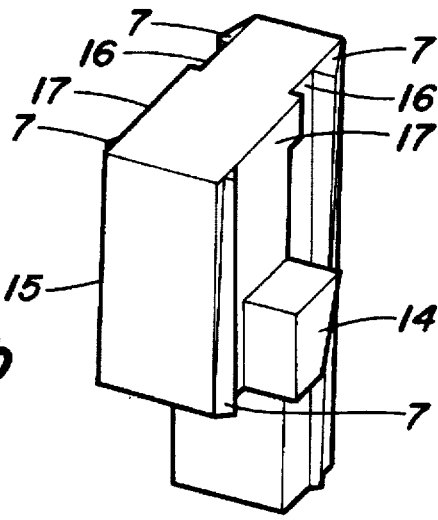
Figure 14C:
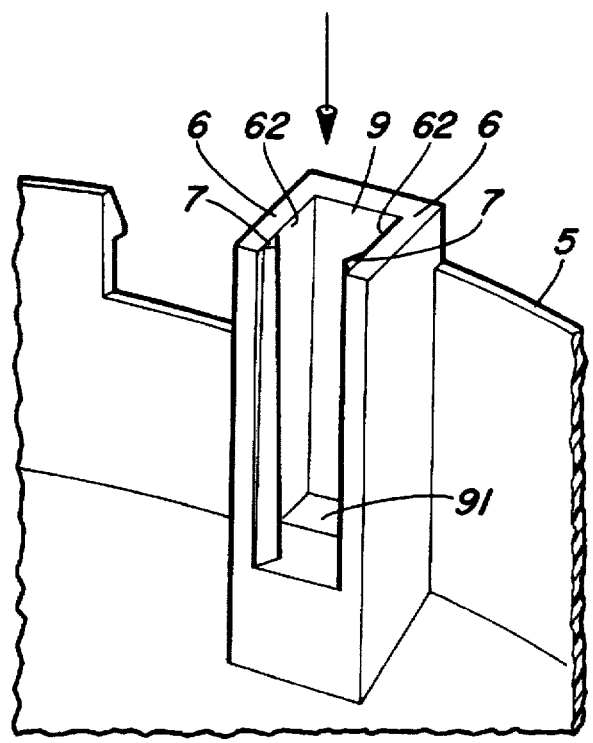

FIG. 14 shows that using an adapter piece 15, the mounting process can be changed relatively simply even in case of a non-universally constructed cap (or base). In FIG. 14c, a detail of cap 5 is shown with holder 9 comprising the supports 6 and ribs 7 are formed only on the inner surface 62 of these, which construction would enable to insert a circuit board oriented in parallel direction to the axis t of the discharge lamp. In case of a circuit board 10 oriented perpendicularly to the axis t seen in FIG. 14a, the adapter piece 15 according to FIG. 14b should be placed in holder 9 so that surfaces 16 of adapter piece 15 become fixed by the ribs 7 formed on inner surfaces 62 of supports 6 and inner surface 62 become fixed by the ribs 7 formed on surface 16. The extent to which adapter piece 15 moves until stop is limited by stop surface 91. Thus, over each inner surface 62 and surface 16, two ribs 7 will be in assembled condition with wedge profiles in opposite position. The two parallel ribs 7 ensure that adapter piece 15 is firmly fixed in holder 9. Edges of notch 11 of the circuit board 10 according to FIG. 14a should become fixed by ribs 7 formed on surfaces 17 of adapter piece 15. The extent to which circuit board 10 is moved until stop is limited by stop 14.

Thus, our invention is a discharge lamp with a mechanical construction solution of fixing for the circuit board of the discharge lamp which construction is able to fit to the differences in the dimensions of the circuit board. In addition, the solution can be applied both in case of a circuit board oriented in parallel and in perpendicular direction to the axis of the discharge lamp. This is true even in case of the same discharge lamp if a rib construction formed to be universal in advance, or if an adapter piece formed to be suitable for this purpose is inserted. The solution can be applied both in case of fixing the circuit board in the base and in the cap. Using our invention the dimensional differences occurring in the manufacturing of circuit boards are successfully compensated for by means of mechanical deformation of the ribs taking place during assembling, which makes the assembling operations more accurate. This is due to the fact that the ribs made from a plastic will be deformed during connecting, and so circuit boards with dimensions within the tolerance range can be firmly fixed.

Based on the scope of protection the discharge lamp according to our invention can be constructed in several ways, and in accordance with our invention is not intended to be limited to the examples shown.

What is claimed is:

1. A single-ended discharge lamp with circuitry in its housing base, which discharge lamp comprises a discharge tube provided with electrodes, containing a fill and sealed in a gas-tight manner, a housing base comprising a circuitry mounted on a circuit board providing for the operation of the discharge tube where the housing base is formed in a way suitable for mechanical and electrical connection to a lamp socket on one part, and for mechanically fixing the discharge tube and connecting the output terminals of the circuitry to the electrode inleads of the discharge tube on the other part, and the housing base is built from two parts, a base and a cap, fixed to each other and the circuit board is inserted between supports formed in the inside of and protruding from one part of the housing base, wherein on each of the supports, at least one longitudinal rib is formed protruding from the surfaces thereof, which supports and ribs are so dimensioned that in the direction of inserting the circuit board, the space available for the circuit board progressively decreases, which results in the circuit board becoming fixed by the ribs over at least a part of the length thereof.

2. A discharge lamp according to claim 1 characterized in that the supports and the ribs are dimensioned to fit the tolerance range of the circuit board.

3. A discharge lamp according to claim 1 characterized in that the ribs are wedge-shaped.

4. A discharge lamp according to claim 1 characterized in that the circuit board is placed in the housing base in perpendicular direction to the axis of the discharge lamp and the circuit board has a notch and edges of the notch become fixed by the ribs.

5. A discharge lamp according to claim 1 characterized in that the circuit board is placed in the housing base in parallel direction to the axis of the discharge lamp and the circuit board becomes fixed along its plane surface by the rib.

6. A discharge lamp according to claim 1 characterized in that on both opposite sides of the housing base, two supports are formed on each of which one rib is formed.

7. A discharge lamp according to claim 6 characterized in that each of the two supports formed on both opposite sides of the housing base has a universal rib construction, including two ribs formed on them for circuit boards to be mounted parallel to an axis of the discharge lamp and two ribs formed for circuit boards to be mounted perpendicular to the axis of the discharge lamp.

8. A discharge lamp according to claim 1 characterized in that the supports each include an adapter piece received in a slot in the supports.

9. A discharge lamp according to claim 1, wherein the longitudinal ribs extend substantially parallel to a central axis of the discharge lamp.

10. A discharge lamp according to claim 1, wherein the ribs are provided on an inner surface of the supports for receiving the circuit board in a first orientation and the ribs are provided on an outer surface of the supports for receiving the circuit board in a second orientation perpendicular to the first orientation.

11. A discharge lamp according to claim 1, wherein a plurality of ribs are formed on each of the supports.

12. A single-ended discharge lamp comprising:

a discharge tube;

a housing providing mechanical and electrical connection to a lamp socket and fixing the discharge tube in place;

a circuit board having circuitry mounted thereon for providing operation of the discharge tube; and supports mounted within the housing for receiving the circuit board, the supports having a first set of longitudinal ribs for securing the circuit board in a first orientation and a second set of longitudinal ribs for securing the circuit board in a second orientation substantially perpendicular to the first orientation.

13. A discharge lamp according to claim 12, wherein the ribs have a wedge shaped cross section and the wedge shaped cross section increases in size in a direction of insertion of the circuit board.

14. A discharge lamp according to claim 12, wherein the circuit board includes at least one notch and the edges of the notch engage the ribs on an exterior surface of the supports.

15. A discharge lamp according to claim 12, wherein the supports include a slot having the first set of longitudinal ribs formed therein and an adapter piece received in the slot having the second set of longitudinal ribs formed thereon.

16. A single-ended discharge lamp comprising:

a discharge tube;

a housing providing mechanical and electrical connection to a lamp socket and for fixing the discharge tube in place, the housing having a central axis extending through a center of the lamp socket when the housing is mounted in the lamp socket;

a support mounted on the housing for receiving a circuit board, the support including a slot with a length extending parallel to the central axis and a plurality of longitudinal ribs within the slot extending parallel to the central axis, the ribs having a cross sectional area which varies along the length of the slot to secure the circuit board to the support member.

17. A discharge lamp according to claim 16, wherein the circuit board is secured to the support by an adapter member.

* * * * *